(12) United States Patent
Salter et al.

(10) Patent No.: US 12,722,495 B2
(45) Date of Patent: Sep. 1, 2026

(54) METHOD AND APPARATUS FOR MANAGING ACCESSORY CHARGING STATIONS ON A VEHICLE

(71) Applicant: Ford Global Technologies, LLC, Dearborn, MI (US)

(72) Inventors: Stuart C. Salter, White Lake, MI (US); Pietro Buttolo, Dearborn Heights, MI (US); John Robert Van Wiemeersch, Novi, MI (US); Brendan Diamond, Grosse Pointe, MI (US); William Wurz, San Francisco, CA (US); Eric Scott Levine, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 973 days.

(21) Appl. No.: 17/980,131

(22) Filed: Nov. 3, 2022

(65) Prior Publication Data

US 2024/0149691 A1 May 9, 2024

(51) Int. Cl.
*B60L 1/00* (2006.01)

(52) U.S. Cl.
CPC .................................... *B60L 1/006* (2013.01)

(58) Field of Classification Search
CPC ....................................................... B60L 1/006
USPC ......................................................... 320/109
See application file for complete search history.

(56) References Cited

U.S. PATENT DOCUMENTS 5,814,968 A * 9/1998 Lovegreen ........... H01M 6/5011 320/113
9,168,835 B2 * 10/2015 Nordstrom .............. B60R 16/03
9,499,088 B1 * 11/2016 Fenchak ................... B60P 7/08
9,725,027 B2 * 8/2017 Hemphill .................. B60P 7/04
10,131,287 B1 * 11/2018 Marino ................... B60R 9/045
10,583,962 B2 3/2020 Brunner et al.
10,703,534 B2 7/2020 Brunner et al.
D895,966 S 9/2020 Brunner et al.
D895,967 S 9/2020 Brunner et al.
D896,517 S 9/2020 Brunner et al.
D896,518 S 9/2020 Brunner et al.
D897,103 S 9/2020 Brunner et al.
D898,320 S 10/2020 Brunner et al.
10,962,218 B2 3/2021 Plato et al.
10,981,696 B2 4/2021 Brunner et al.
D917,977 S 5/2021 Brunner et al.
(Continued)

FOREIGN PATENT DOCUMENTS

CN 108237920 A 7/2018
CN 112721709 A 4/2021
(Continued)

OTHER PUBLICATIONS

US 10,947,009 B2, 03/2021, Brunner et al. (withdrawn)

*Primary Examiner* — Suresh Memula
(74) *Attorney, Agent, or Firm* — Vichit Chea; Carlson, Gaskey & Olds, P.C.

(57) ABSTRACT

A system and method to manage charging priority for at least one accessory includes the steps of: providing one or more charging stations for the at least one accessory, monitoring vehicle power status, and monitoring accessory charging status. Additionally, the allocation of power supplied to the one or more charging stations is managed based on priority requirements as determined per each accessory.

26 Claims, 2 Drawing Sheets

(56) References Cited

U.S. PATENT DOCUMENTS

| | | | | |
|---|---|---|---|---|
| D918,584 | S | 5/2021 | Brunner et al. | |
| D919,296 | S | 5/2021 | Brunner et al. | |
| 11,008,136 | B2 | 5/2021 | Brunner et al. | |
| D920,671 | S | 6/2021 | Brunner et al. | |
| 11,027,883 | B1 | 6/2021 | Brunner et al. | |
| D923,935 | S | 7/2021 | Brunner et al. | |
| 11,192,690 | B1 | 12/2021 | Brunner et al. | |
| 11,268,691 | B2 | 3/2022 | Plato et al. | |
| 11,365,026 | B2 | 6/2022 | Brunner et al. | |
| 11,427,382 | B2 | 8/2022 | Brunner et al. | |
| 11,465,805 | B2 | 10/2022 | Brunner et al. | |
| 2013/0300143 | A1* | 11/2013 | Dunn | B60R 9/00 296/3 |
| 2015/0084584 | A1* | 3/2015 | Monks | H02J 7/50 320/108 |
| 2019/0016231 | A1* | 1/2019 | Scaringe | H01M 10/613 |
| 2019/0337394 | A1* | 11/2019 | Butash | B60L 58/12 |
| 2019/0351783 | A1 | 11/2019 | Goei | |
| 2020/0148280 | A1* | 5/2020 | Elder | B60R 9/052 |
| 2020/0317057 | A1* | 10/2020 | Salter | B60L 1/006 |
| 2020/0384864 | A1* | 12/2020 | Books | B60L 1/003 |
| 2023/0406139 | A1* | 12/2023 | Salter | B60L 53/64 |

FOREIGN PATENT DOCUMENTS

| | | | |
|---|---|---|---|
| CN | 14389339 | A | 4/2022 |
| WO | 2022040985 | A1 | 3/2022 |

* cited by examiner

METHOD AND APPARATUS FOR MANAGING ACCESSORY CHARGING STATIONS ON A VEHICLE

TECHNICAL FIELD

This disclosure relates generally to a method and apparatus used to manage charging priority for accessories transported by a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. While some accessories may have sufficient charge for the day, certain other accessories, such as power tools for example, require charging throughout the workday.

SUMMARY

In some aspects, the techniques described herein relate to a method including the steps of: providing one or more charging stations for at least one accessory; monitoring vehicle power status; monitoring accessory charging status; and managing allocation of power supplied to the one or more charging stations based on priority requirements as determined per each accessory.

In some aspects, the techniques described herein relate to a method, wherein at least one of the priority requirements comprises a task or job to be completed on a work site.

In some aspects, the techniques described herein relate to a method, the method further including determining at least one accessory power requirement for the at least one accessory, determining available charge that can be provided by a vehicle power source, and charging the at least one accessory if sufficient charge is available.

In some aspects, the techniques described herein relate to a method, wherein the at least one accessory comprises at least a first accessory and a second accessory, and wherein the one or more charging stations comprises only one charging station, and including: identifying a location of the charging station, determining the at least one accessory power requirement for each of the first accessory and the second accessory, determining which of the first accessory and the second accessory has charging priority, and communicating to a user which of the first accessory and the second accessory should be moved to the charging station.

In some aspects, the techniques described herein relate to a method, wherein, when the first accessory is prioritized over the second accessory, fully charging the first accessory and communicating to the user that the second accessory can be moved to the charging station once the first accessory is fully charged.

In some aspects, the techniques described herein relate to a method, wherein the at least one accessory comprises at least a first accessory and a second accessory, and wherein the one or more charging stations comprises at least a first charging station and a second charging station, and including: identifying a location for each of the first charging station and the second charging station, verifying that the first accessory and the second accessory are each connected to one of the first charging station and the second charging station, determining the at least one accessory power requirement for each of the first accessory and the second accessory, determining which of the first accessory and the second accessory has charging priority, and simultaneously charging both the first accessory and the second accessory if the available charge is sufficient, or when the first accessory is prioritized over the second accessory, charging the first accessory before the second accessory if available charge is insufficient to charge both the first accessory and the second accessory, and charging the second accessory subsequent to the first accessory if any remaining charge is available.

In some aspects, the techniques described herein relate to a method, wherein the at least one accessory comprises at least a first accessory and a second accessory, and including connecting the first accessory to one of the charging stations, stacking the second accessory on the first accessory, and feeding power through the first accessory to charge the second accessory.

In some aspects, the techniques described herein relate to a method, the method further including using at least IoT data to determine priority requirements for each accessory.

In some aspects, the techniques described herein relate to a method, the method further including using IoT data, vehicle sensor data, and/or user input data to determine priority requirements for each accessory.

In some aspects, the techniques described herein relate to a method, the method further including providing a base plate in a vehicle cargo area, providing a first power connection interface at each charging station, providing the at least one accessory with a second power connection interface, and coupling the at least one accessory to the base plate using a foot/aperture connection interface to align the first and second power connection interfaces with each other.

In some aspects, the techniques described herein relate to a method, the method further including powering the first power connection interface with a vehicle power source.

In some aspects, the techniques described herein relate to a system, the system including: at least one charging station for at least one accessory; a plurality of sensors to monitor vehicle power status and accessory charging status; and a controller to control allocation of power supplied to the at least one charging station based on priority requirements as determined per each accessory.

In some aspects, the techniques described herein relate to a system, wherein at least one accessory power requirement is determined for the at least one accessory, and wherein the controller determines available charge that can be provided by a vehicle power source, and wherein the at least one accessory is charged via the at least one charging station if sufficient charge is available.

In some aspects, the techniques described herein relate to a system, wherein the at least one accessory comprises at least a first accessory and a second accessory, and wherein the at least one charging station comprises only one charging station, and wherein the controller is configured to: identify a location of the charging station, determine the at least one accessory power requirement for each of the first accessory and the second accessory, determine which of the first accessory and the second accessory has charging priority, and communicates to a user which of the first accessory and the second accessory should be moved to the charging station.

In some aspects, the techniques described herein relate to a system, wherein, when the first accessory is prioritized over the second accessory, the controller fully charges the first accessory and communicates to the user that the second accessory can be moved to the charging station once the first accessory is fully charged.

In some aspects, the techniques described herein relate to a system, wherein the at least one accessory comprises at least a first accessory and a second accessory, and wherein the at least one charging station comprises at least a first charging station and a second charging station, and wherein the controller is configured to: identify a location for each of the first charging station and the second charging station, verify that the first accessory and the second accessory are each connected to one of the first charging station and the second charging station, determine the at least one accessory power requirement for each of the first accessory and the second accessory, determine which of the first accessory and the second accessory has charging priority, and simultaneously charges both the first accessory and the second accessory if the available charge is sufficient, or when the first accessory is prioritized over the second accessory, charges the first accessory before the second accessory if available charge is insufficient to charge both the first accessory and the second accessory, and charges the second accessory subsequent to the first accessory if any remaining charge is available.

In some aspects, the techniques described herein relate to a system, wherein the at least one accessory comprises at least a first accessory and a second accessory, and wherein the first accessory is connected to the at least one charging station, the second accessory is stacked on the first accessory, and power is fed through the first accessory to charge the second accessory.

In some aspects, the techniques described herein relate to a system, wherein the controller receives IoT data, vehicle sensor data, and/or user input data to determine priority requirements for each accessory.

In some aspects, the techniques described herein relate to a system, the system including: a base plate positioned in a vehicle cargo area; a first power connection interface at each charging station; and a second power connection interface provided on the at least one accessory, and wherein the at least one accessory is coupled to the base plate using a foot/aperture connection interface to align the first and second power connection interfaces with each other.

In some aspects, the techniques described herein relate to a system, wherein the first power connection interface is powered using a vehicle power source.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an accessory mounting system where accessories are mounted to a base plate that is positioned within a vehicle cargo area. Various types of accessories can be secured to the vehicle through the attachment interface provided by the base plate. The accessories can be electrically coupled to the base plate such that the vehicle can power or recharge the accessories. For example, a cooler or refrigerator can be powered by electrically connecting to a power supply interface provided by the base plate, or a tool box accessory that includes power tools can be connected to the power supply interface such that the power tools can be charged. The disclosure provides for a system and method that identifies accessories that require charging, analyzes data to determine accessory charge status and availability, and manages charging priority for the accessories.

Figures 1, 2:
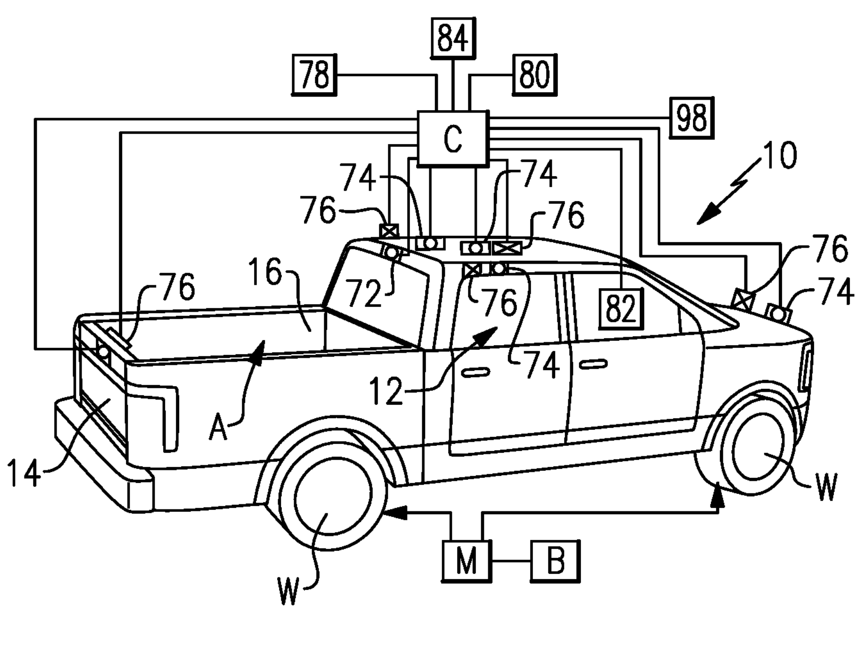
FIG. 1 illustrates a perspective view of a vehicle having a cargo bed that can be equipped with a base plate used to secure and charge accessories according to an exemplary aspect of the present disclosure.
FIG. 2 is a schematic section view of multiple accessories mounted to a base plate via a power attachment interface.

FIGS. 1-2 disclose an exemplary embodiment of a base plate system that is configured to support a plurality of accessories within a vehicle cargo area. In one example, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area A.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

At least one base plate 20 is positioned within the cargo bed 16. Various accessories and/or modules 22 can be secured to the vehicle 10 by engaging one or more of the base plates 20. The accessories/modules 22 can comprise a lockable storage accessory 22 that holds hand tools and other work site items, a refrigerator R, cooler, etc. The accessory 22 could also be a lidded lockable container **22*a* that includes a compartment for storing power tools or other items 30** that require power or a data connection.

The accessories 22 can engage one or more of the base plates 20 using an attachment system. The base plate 20 comprises a four-sided generally flat and planar mount surface to support the accessories 22. In the exemplary embodiment, the attachment system for the base plate 20 includes a plurality of apertures 24 and at least one foot 26 that cooperate with each other to provide a mechanical connection interface. The base plate 20 is supported relative to the vehicle surface 18 of the cargo area A with an additional support interface that is separate from the mechanical connection interface for the accessories 22.

In one example, the base plate 20 provides the apertures 24 and the accessories 22 include the plurality of feet 26. This could be rearranged, however, such that one or all of the feet 26 extend from the base plate 20 and the accessories 22 provide some or all of the apertures 24.

In the exemplary embodiment, when the base plate 20 and the accessories 22 are engaged, the feet 26 are each received within one of the apertures 24 such that the feet 26 each extend from a first side of the base plate 20, through one of the apertures 24, and past an opposite, second side of the base plate 20. Once the feet 26 are inserted through the apertures, the feet are moved to a locking position such that the accessory cannot be removed from the base plate 20. To remove the accessory, the feet 26 are moved to an unlocking position such that the accessory can be lifted from the base plate 20.

In one example, the accessory 22 comprises an accessory box that includes a power interface 32 as shown in FIG. 2. This would allow devices within the accessory box to be powered from a vehicle power supply 34 such as the battery pack B, for example. The internal device could be a refrigerated container that is powered by the vehicle 10 when the accessory box is engaged with the base plate 20, or the devices within the box accessory could comprise rechargeable tools 30, which can be recharged when set within the accessory box and coupled to the charging interface 32 between the accessory 22 and the base plate 20.

In one example, the base plate 20 can be plugged into either 12V vehicle power or other power sources via a variety of connections/outlets. These power sources supply power to charge or power the accessories 22 via the power supply connection interface 32 on the base plate 20. In one example, while the vehicle is off, a system for managing charging can only draw a maximum of approximately 300 W or less (due to current being drawn to keep other functions in the vehicle awake) as other features use power. As such, the system needs to manage which accessories 22 charge first, and manage how much power can be supplied to each accessory 22 for charging purposes.

As shown in FIG. 2, each accessory has an accessory power interface (API) and each base plate charging location has a plate power interface (PPI). The API and the PPI can be a direct electrical connection or can be via an inductive wireless charging connection. The PPI receive vehicle power via the vehicle power supply 34.

Figure 3:
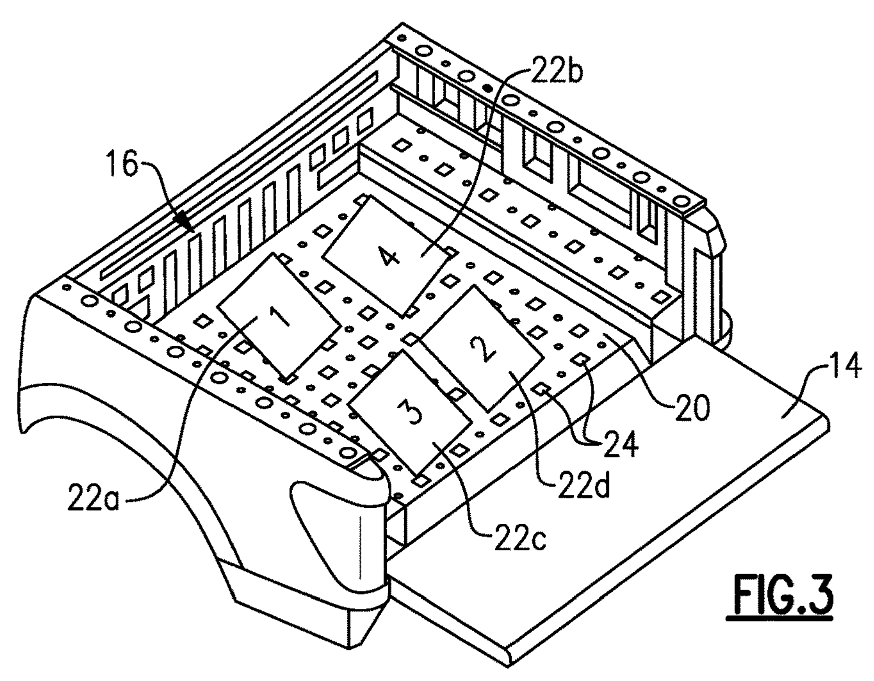
FIG. 3 is a schematic view of multiple accessories attached to a base plate at charging locations.

Various issues are raised concerning the power supply and charging management. First, while the base plate 20 is configured to mount multiple accessories 22, not all locations on the base plate 20 may have a power supply connection interface 32. In other words, there may be four mounting locations, stations 1-4 as shown in FIG. 3 on the base plate 20, but only two of these stations may have a power supply connection interface 32. Second, the accessories 22 may be taken off the vehicle 10 and moved to a worksite or interchanged with other vehicles. For example, a vehicle transporting multiple accessories 22 can arrive at a building/work site. Some accessories may be taken into the building, while some accessories may be left on the vehicle. During the day, one or more of the accessories 22 may require charging.

The system is configured to control when an accessory 22 is charged given the total power limitation and the limitation on which base plate locations have charging interfaces 32. Additionally, the system communicates this information to the user/customer during loading or unloading of accessories 22 from the base plate 20. The system identifies accessories 22 that require charging, analyzes vehicle and operational data to determine accessory charge status and availability, and manages charging priority for the accessories 22. For example, the system may suggest that some accessories 22, which are not identified as being removed from the vehicle 10 for the job, be repositioned to a charging location when arriving on site. The user can also provide information, e.g., data input, to the system such as typical work schedules, scheduled break times, and length of time for breaks and meals. Additionally, in situations where there are work fleets, the system can identify other vehicles from the same company such that the vehicles can share charging of accessories while at the same location.

The subject disclosure provides an apparatus and a method to manage allocation of charging stations on a vehicle 10 where modules/accessories 22 in need of charge are prioritized depending on task or job requirements. In one example, allocation of power among charging stations is determined based on known optimization techniques or operations research. For example, the Internet of Things (IoT) can be utilized, which is a system of interrelated computing devices, mechanical and digital machines, objects, animals, or people that are provided with unique identifiers (UIDs) and the ability to transfer data over a network without requiring human-to-human or human-to-computer interaction.

In one example, existing vehicle sensors are used to provide information to a system controller C to analyze accessory position/location within the cargo area A as well as power/charging status of each accessory 22. Once the system controller C receives the data/information, an analysis is performed and it is determined if any suggestions can be made to the user/driver to adjust accessory location within the cargo area A for charging purposes. The system controller C also uses the data/information to analyze whether accessories 22 that are already located at a power connection interface 32 can be fully charged/powered or only partially charged/powered, as well as prioritizing accessories for power/charging.

In one example, the sensors include one or more of a center high-mounted stop lamp (CHMSL) camera 72, additional cameras 74, sonar and/or radar sensors 76, and any other vehicle sensors 78, e.g. on-board scales (OBS), etc., to determine position/location of accessories and charging stations in the cargo area A. Wireless communication via a wireless interface 80 also takes place between accessories 22 attached to the base plate 20 and the controller C to determine if accessories/accessories 22 are actually attached to the base plate 20, and to determine charging status of each accessory 22. Wireless communication can also take place between any of the sensors 72-78 and the controller C.

In one example, the vehicle uses one or more of the sensors 72-78 to identify the number and location of charging interfaces 32 on the base plate 20. Additionally, the controller C receives data regarding the type of each accessory 22 through a unique identifier code, for example. The controller C also receives data from a user/driver or database regarding the details of each workday, jobsite, and type of work being done. Each accessory 22 also includes sensors S and communication protocols to communicate charging status and power requirements to the controller C.

In one example, the system controller C communicates with and/or monitors travel information to determine if the vehicle will be travelling to a new location and is configured to make charging recommendations if necessary. In one example, the travel information is obtained via a route guidance system 82, a user's schedule, and/or a user's smart device 84. If the vehicle 10 is expected to travel longer distances, e.g. distances greater than a few miles, the vehicle system uses the vehicle sensors to determine the charge status of each accessory 22, identify the most important accessories 22 for priority charging, and to make any recommendations as to whether accessories 22 not currently attached to a power interface 32 should be moved to a power interface 32 on the base plate 20 for charging during travel.

In one example, the controller C is a dedicated control unit, or the controller C can be incorporated as part of an existing controller on the vehicle 10. The controller C can include a processor, memory, and one or more input and/or output (I/O) device interface(s) that are communicatively coupled via a local interface. The local interface can include, for example but not limited to, one or more buses and/or other wired or wireless connections. The local interface may include address, control, and/or data connections to enable appropriate communications among the aforementioned components. The controller C may be a hardware device for executing software, particularly software stored in memory. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The Input/Output devices that may be coupled to system I/O Interface(s) may include input devices, for example but not limited to, a keyboard, mouse, scanner, microphone, camera, proximity device, smart device, etc. Further, the Input/Output devices may also include output devices, for example but not limited to, a printer, display, smart device, etc. The controller C can be configured to execute software stored within the memory, to communicate data to and from the memory, and to generally control operations of the computing device pursuant to the software.

In the subject disclosure, the controller C receives data from various inputs, e.g. vehicle sensors 72-78, direct user input, IoT data, etc., and is configured to process the data, and analyze the data to recommend and/or suggest charge/power adjustment options via an output device 98. The output device 98 comprises an audio output, an output to a vehicle screen/display, an output to a smart device, etc. In one example, the controller C determines the various locations of power connection locations within cargo bed area A, determines the charge status of each accessory 22, and then determines whether low-charge/high-priority accessories should be moved from a non-powered location to a powered location on the base plate 20. The controller C also determines priority of charging, e.g. by frequency of usage, type of accessory, etc. between accessories 22 that are mounted to the power supply interface 32 within the cargo area A. For example, if there are multiple charging stations, the controller C can determine which stations get full power right away and which stations can wait until higher priority accessories are charged. The controller C is also configured to optimize and prioritize the recommendations as discussed above.

Figure 4:
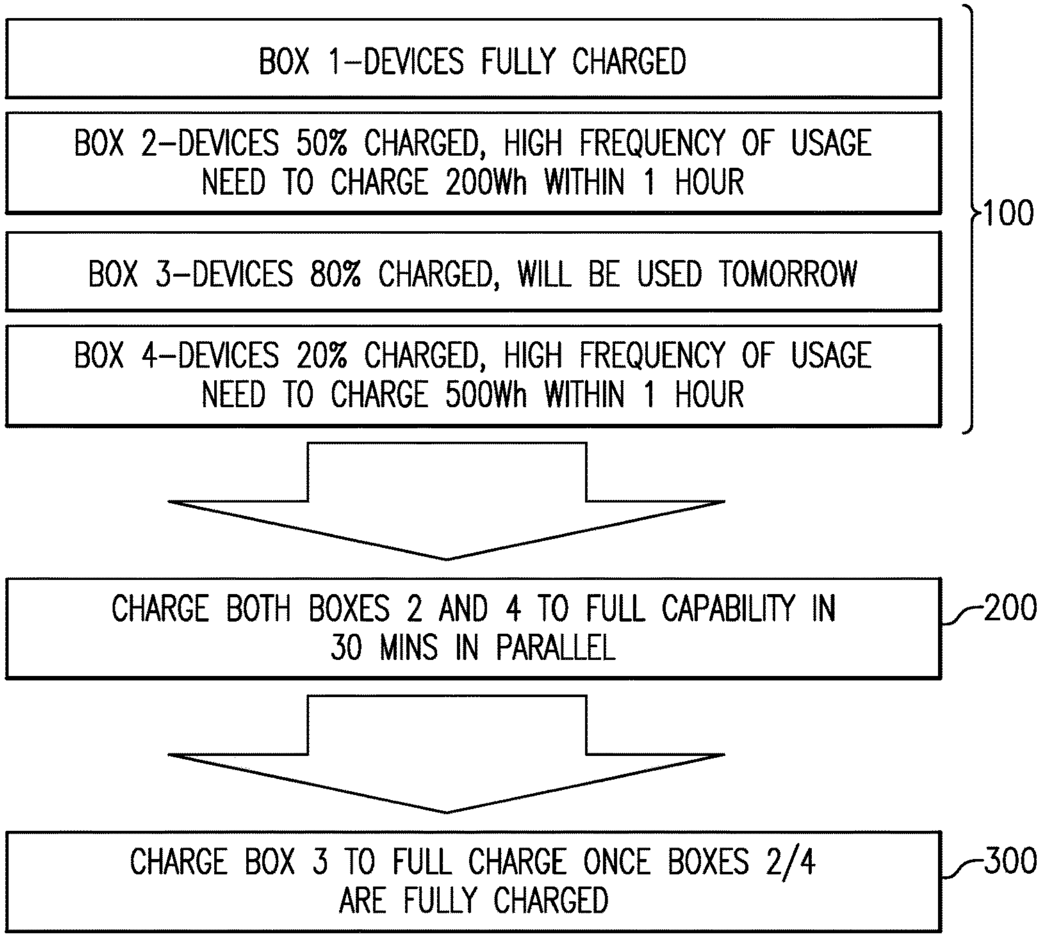
FIG. 4 is a flow diagram indicating an exemplary charging schedule.

FIG. 3 shows one example where there are four charging stations: station 1, station 2, station 3, station 4. The stations are spread out over the base plate 20 such that there is sufficient space provided between charging stations. Fewer or additional stations can be provided as necessary, and the locations can also be varied from that which is shown. An example of a charging priority schedule is shown in FIG. 4 for a system having 750 W of charging capability. As shown at step 100, the controller C determines the frequency of use and charging status of each of the four accessory boxes 22*a-d*. In this example, the following is identified: devices in accessory box 22*a* are fully charged; the devices in accessory box 22*b* are 50% charged, have high frequency usage, and need to charge 200 Wh in one hour; the devices in accessory box 22*c* are 80% charged and will be used the next day: and the devices in accessory box 22*d* are 20% charged, have high frequency usage, and need to charge 500 Wh in one hour. At step 200, the controller uses this data to charge accessory boxes 22*b* and 22*d* to full capability in thirty minutes in parallel. Subsequently, at step 300, the controller charges accessory box 22*c* to full charge once accessory boxes 22*b* and 22*d* are fully charged.

Various methods can be employed to identify the accessory 22 the user/operator desires to charge, to communicate to the user/operator on which charging station to place the accessory 22, or where to place the accessory 22 in a non-charging location to wait for a current accessory 22 to finish charging. Additionally, for a jobsite that includes a plurality of vehicles, the controller C can suggest a way to share charging stations among the various vehicles. The controller C can identify the total number of available charging stations and notify the user/operator as to which vehicle the accessory 22 should be brought to for charging purposes. In one example, the controller C will do an overall system check, before any vehicle departs, to make sure that all accessories 22 belonging to each vehicle are loaded and secured on the proper vehicle, and that accessories 22 charging on one vehicle but belonging to a crew from another vehicle are properly unloaded.

In one example, the controller C determines a priority to accessories/charging both when the vehicle is key-off and key-on. This is because power is limited in the key-off state, due to the 750 W DCDC system configuration, for example. Priority may also be based on whether a BEV is under active charge (plug-in or wireless charging) because when the BEV is under charge the key state is not relevant. As a result, the controller C comprises a scheduling manager that is needed both to control which accessories 22 are charging (most important first) and to remind users/operators when accessories 22 off vehicle need to be charged in advance of running out of power. In one example, the scheduling manager would consider various data, in any combination, as discussed below. Historical accessory/power use is input data that is provided by the controller C monitoring accessory state of charge (SOC) over the day using various sensors as discussed above. Historical usage regarding how often the accessory 22 is removed from the base plate 20 and the battery charge depletion data for each device/battery can be used to determine where charging priority should be placed, e.g. tools/batteries that are depleted more often should receive higher charging priority compared to those used less often.

Also, the controller C is able to identify hand tool accessories over static accessories that have not moved or been opened. The scheduling manager can also identify accessories that are on vehicle versus off vehicle within a predetermined range, e.g. 600 ft, or accessories that arrived with the vehicle at the beginning of a shift. The user/operator can provide input data by setting priority ranking of each accessory to charge, and identifying which accessories can be interrupted for charging. Also, the controller C considers input for powering the vehicle versus providing power to the base plate 20 for scheduling purposes. Power level to the base plate 20 may be reduced under certain dynamic conditions, e.g. when the vehicle is being used as a mobile office in a key-off situation.

Other things that are used for scheduling purposes include identification of time slots for meal and break schedule charging. For example, the controller C can monitor power use of the accessory 22, identify that the accessory 22 will not make end of shift, and recommend charging during meal/breaks. In one example, the power devices and/or batteries can each have a unique identifier I, such as a unique radio frequency identification (RFID) and/or Bluetooth® low energy (BLE) tag, or an Ultra-Wideband (UWB) tag. The vehicle can use signal triangulation to understand which devices/batteries are in each accessory 22. The devices/batteries can also communicate to the controller their current state-of-charge (SOC) status, remaining energy available, amount of energy required for full charge, and a charge rate so the vehicle charging management system can understand each device/battery charge rate, what accessory 22 to charge, and when each accessory 22 is fully charged. If RFID/BLE/UWB tags are not available for each device/battery, the devices/batteries can be assigned to a specific charging bin, and user input can be used to provide charging priority and to indicate how long each device should be charged to ensure they are ready for usage when needed.

In one example, if available, usage data for each accessory/device 22 can be linked to a worker's schedule and job site so the vehicle charging management system can automatically determine what accessory/device will be used at the next, and future, work assignment to ensure each accessory/device is ready for usage. The frequency of accessory charging will vary because not all accessories will need to be charged regularly. For example, a simple lock accessory could go for weeks or months without being charged versus an accessory that holds battery packs for hand tools that may need charging every day. Or, in another example, an accessory that has an air compressor/lithium ion battery may need to be charged at lunch every day to have enough power to finish the shift. Accessory charging, e.g. moving to a charging spot, will normally be at the start and end of a day with moving in between only as necessary to get through a shift.

In one example, when the user/operator is putting accessories back on the vehicle, the vehicle will tell the user/operator where to put and/or orient the accessories to get the charging required. In one example, existing vehicle hardware and sensors, such as the CHMSL camera 72 and sound exciter 98 for example, can be used to provide this feedback to the user/operator.

In one example, nearby vehicles from the same company can communicate via the wireless communication interface 80, e.g. BLE/UWB/wifi, etc., to share accessory charging (to stay within the power constraints of key-off for each vehicle). If an accessory 22 needs charging and no space is available on the home vehicle, the user/operator will be notified to place it on a nearby vehicle for charging. In one example, before the transmission can be put in a drive mode, the driver will be notified if any accessories 22 are missing from the vehicle as compared to when the vehicle arrived on the work site. This could include accessories 22 that are somewhere else on the work site or accessories 22 that are charging on another vehicle. Additionally, the driver of a ready-to-depart vehicle will be notified if accessories 22 belonging to a different crew are currently charging on board and need to be unloaded.

Additional features that the system provides for accessory and charging station identification and location recommendations are discussed below. For example, when a user/operator is putting accessories back on the vehicle, the vehicle might employ a variety of techniques to identify the accessory 22. Examples include: RFID tag used to determine an accessory moving closer to the cargo bed area A; cameras used to scan a tag on the accessory 22; using identifier tags to clearly identify charging stations; using triangulation with sufficient accuracy in positioning, e.g. UWB time of flight, BLE angle of arrival. Another possible feature includes using an accelerometer (or other vehicle sensors) on the accessory to start broadcasting when an accessory is being moved/lifted. In another example, once an accessory is determined to need charging, and to have the needed priority to access a charging point, different methods could be used to tell the user/operator where to place the accessory. In one example, a sound exciter 98 can be used to tell the user/operator the ID and location of the charging station, e.g. audible announcement of "charging station 3, forward to the right". In another example, a status indicator L, e.g. LED bar on the charging unit, could be used to flash or change color according to predefined pattern to identify the location; if the accessory is also equipped with a status light indicator L, the indicator can flash according to the same pattern to confirm to the user/operator that the correct accessory is being placed in the right place. In another example, the system can point to a location of the vehicle layout shown on an in-cabin display screen or personal smart device used by the user/operator.

With regard to charging rate, depending on the task, the system can determine that it might not be possible to fully recharge all accessories, and the system will then set the charging rate at different level at each charging location to make sure accessories that are needed next have proper level of charge. Known methods from operation research optimization can be used to determine whether to use fewer units than available, but at a higher charging rate, or to employ them all simultaneously, but using trickling charge.

The accessories can also be used to provide many different functions. In one example, a supplemental battery pack could be provided where an accessory box is used to charge multiple spare 18V type or other type of tool batteries if sufficient charge is available. In another example, an amplified speaker can be coupled to one of the charging stations to provide music for the worksite, or the ability to patch announcements or alerts. In another example, an air quality sensor could be powered via the base plate power interface PPI, which would be useful for indoor worksites, such as large buildings or complexes for example. In another example, first aid equipment, such as a defibrillator for example, could be powered or charged via the base plate power interface PPI. In another example, a removable GPS module could be charged as an accessory to gain precision GPS coordinates for locations where the vehicle cannot access.

In another example, stacked wireless charging could be provided where accessories 22 can be stacked on top of each other and charged as shown in FIG. 2. In this configuration, a power feed through structure 50 would be provided such that the power supplied to the lower accessory can be transferred to the upper accessory stacked on top of the lower accessory. The power feed through structure 50 could comprise a direct electrical connection or a wireless charging connection, for example.

There are also various challenges presented for direct or inductive charging. In one example, when a 110V system is used, a GFI is needed to protect for water ingress into the system. There could be a global GFI; however, that would shut down power to all the accessories. A GFI per accessory could optionally be provided; however that would be more expensive and complicated. In another configuration, one GFI could be provided for a subset of the charging locations.

In one example, when an inductive charging configuration is used, Qi or other similar chargers present certain challenges. These types of chargers typically have a Foreign Object Detection (FOD) system to shut down charging in the presence of metal. If a device is placed on the charger and there is a metal object, e.g. wrench, pliers, etc., between the charger primary coil and the receiving coil, the associated device may become overheated. A FOD system determines power to be delivered and power to be sent. If these two quantities do not match, the FOD algorithm assumes there is a foreign object causing the loss and it shuts down charging. Such a system would also add expense and would be needed for each charging location.

Both of these systems will radiate EMI and that too will need to be validated to ensure there are no EMC issues with other vehicle systems, particularly passive key fobs which operate in the same relative frequency spectrum.

An alternate approach to 110V or inductive charging could be 18V or 24 DC charging using a known track system. With this system being an 18V or 24V DC system, it can be touched without issue, and water and EMI are also not at issue. However, the alternating strips for the system may have FOD issues and disrupt power delivery.

The subject disclosure provides a system and method that determines accessory charging locations and charging status within the cargo area for prioritizing charging of multiple accessories. This maximizes charging capability for accessories.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method comprising:

providing one or more charging stations on a base plate for at least one accessory, each charging station including at least one power connection interface;

forming a mechanical connection interface to connect the at least one accessory to the base plate that is separate from the at least one power connection interface;

monitoring vehicle power status;

monitoring accessory charging status; and managing allocation of power supplied to the one or more charging stations based on priority requirements as determined per each accessory.

2. The method of claim 1, wherein at least one of the priority requirements comprises a task or job to be completed on a work site.

3. The method of claim 1, including determining at least one accessory power requirement for the at least one accessory, determining available charge that can be provided by a vehicle power source, and charging the at least one accessory if sufficient charge is available.

4. The method of claim 3, wherein the at least one accessory comprises at least a first accessory and a second accessory, and wherein the one or more charging stations comprises only one charging station, and including identifying a location of the charging station, determining the at least one accessory power requirement for each of the first accessory and the second accessory, determining which of the first accessory and the second accessory has charging priority, and communicating to a user which of the first accessory and the second accessory should be moved to the charging station.

5. The method of claim 4, wherein, when the first accessory is prioritized over the second accessory, fully charging the first accessory and communicating to the user that the second accessory can be moved to the charging station once the first accessory is fully charged.

6. The method of claim 3, wherein the at least one accessory comprises at least a first accessory and a second accessory, and wherein the one or more charging stations comprises at least a first charging station and a second charging station, and including identifying a location for each of the first charging station and the second charging station, verifying that the first accessory and the second accessory are each connected to one of the first charging station and the second charging station, determining the at least one accessory power requirement for each of the first accessory and the second accessory, determining which of the first accessory and the second accessory has charging priority, and simultaneously charging both the first accessory and the second accessory if the available charge is sufficient, or when the first accessory is prioritized over the second accessory, charging the first accessory before the second accessory if available charge is insufficient to charge both the first accessory and the second accessory, and charging the second accessory subsequent to the first accessory if any remaining charge is available.

7. The method of claim 1, wherein the at least one accessory comprises at least a first accessory and a second accessory, and including connecting the first accessory to one of the charging stations, stacking the second accessory on the first accessory, and feeding power through the first accessory to charge the second accessory.

8. The method of claim 1, including using at least IoT data to determine priority requirements for each accessory.

9. The method of claim 8, including using IoT data, vehicle sensor data, and/or user input data to determine priority requirements for each accessory.

10. The method of claim 1, including positioning the base plate in a vehicle cargo area, and wherein the at least one power connection interface comprises a first power connection interface at each charging station, and including providing the at least one accessory with a second power connection interface, and coupling the at least one accessory to the base plate using the mechanical connection interface which comprises a foot/aperture connection interface to align the first and second power connection interfaces with each other.

11. The method of claim 10, including powering the first power connection interface with a vehicle power source.

12. The method of claim 1, wherein the base plate includes a plurality of apertures and the at least one accessory includes one or more feet, and including:

selectively inserting each foot into one aperture to connect the base plate and the at least one accessory via the mechanical connection interface, wherein when the base plate and the at least one accessory are connected, each foot extends from a first side of the base plate, through one of the plurality of apertures, and past an opposite, second side of the base plate;

once each foot is inserted through one aperture, subsequently moving the foot to a locking position such that the at least one accessory cannot be removed from the base plate; and each foot is subsequently removable by moving the foot to an unlocking position such that the at least one accessory can be removed from the base plate.

13. The method of claim 1, including:

providing information from vehicle sensors comprising one or more cameras, sonar, and/or radar sensors to a controller to determine accessory position and/or location for each accessory relative to the base plate; and analyzing the information and determining if adjustments of one or more accessory locations are needed for charging purposes.

14. A system comprising:

at least one charging station on a base plate for at least one accessory, each charging station including at least one power connection interface;

a mechanical connection interface that is separate from the at least one power connection interface and which is configured to connect the at least one accessory to the base plate;

a plurality of sensors to monitor vehicle power status and accessory charging status; and a controller to control allocation of power supplied to the at least one charging station based on priority requirements as determined per each accessory.

15. The system of claim 14, wherein at least one accessory power requirement is determined for the at least one accessory, and wherein the controller determines available charge that can be provided by a vehicle power source, and wherein the at least one accessory is charged via the at least one charging station if sufficient charge is available.

16. The system of claim 15, wherein the at least one accessory comprises at least a first accessory and a second accessory, and wherein the at least one charging station comprises only one charging station, and wherein the controller is configured to identify a location of the charging station, determine the at least one accessory power requirement for each of the first accessory and the second accessory, determine which of the first accessory and the second accessory has charging priority, and communicate to a user which of the first accessory and the second accessory should be moved to the charging station.

17. The system of claim 16, wherein, when the first accessory is prioritized over the second accessory, the controller fully charges the first accessory and communicates to the user that the second accessory can be moved to the charging station once the first accessory is fully charged.

18. The system of claim 15, wherein the at least one accessory comprises at least a first accessory and a second accessory, and wherein the at least one charging station comprises at least a first charging station and a second charging station, and wherein the controller is configured to identify a location for each of the first charging station and the second charging station, verify that the first accessory and the second accessory are each connected to one of the first charging station and the second charging station, determine the at least one accessory power requirement for each of the first accessory and the second accessory, determine which of the first accessory and the second accessory has charging priority, and simultaneously charges both the first accessory and the second accessory if the available charge is sufficient, or when the first accessory is prioritized over the second accessory, charges the first accessory before the second accessory if available charge is insufficient to charge both the first accessory and the second accessory, and charges the second accessory subsequent to the first accessory if any remaining charge is available.

19. The system of claim 14, wherein the at least one accessory comprises at least a first accessory and a second accessory, and wherein the first accessory is connected to the at least one charging station, the second accessory is stacked on the first accessory, and power is fed through the first accessory to charge the second accessory.

20. The system of claim 14, wherein the controller receives IoT data, vehicle sensor data, and/or user input data to determine priority requirements for each accessory.

21. The system of claim 14, wherein:

the base plate is positioned in a vehicle cargo area;

the at least one power connection interface comprises a first power connection interface at each charging station;

a second power connection interface is provided on the at least one accessory;

the at least one accessory is coupled to the base plate using the mechanical connection interface which comprises a foot/aperture connection interface to align the first and second power connection interfaces with each other.

22. The system of claim 21, wherein the first power connection interface is powered using a vehicle power source.

23. The system of claim 14, wherein the base plate includes a plurality of apertures and the at least one accessory includes one or more feet that are selectively insertable into the plurality of apertures, and when the base plate and the at least one accessory are connected, each foot is received within one aperture to provide the mechanical connection interface.

24. The system of claim 23, wherein:

when the base plate and the at least one accessory are connected, each foot extends from a first side of the base plate, through one of the plurality of apertures, and past an opposite, second side of the base plate; and once each foot is inserted through one aperture, the foot is moved to a locking position such that the at least one accessory cannot be removed from the base plate, and each foot is subsequently removable by moving the foot to an unlocking position such that the at least one accessory can be removed from the base plate.

25. The system of claim 14, wherein vehicle sensors comprising one or more cameras, sonar, and/or radar sensors provide information to the controller to determine accessory position and/or location for each accessory relative to the base plate, and wherein the controller analyzes the information and determines if adjustments of one or more accessory locations are needed for charging purposes.

26. The system of claim 25, wherein the controller is configured to:

determine a location of each power connection interface;

determine a charge percentage of each accessory; and determine whether there are low-charge and/or high-priority accessories that should be moved from a non-powered location to a powered location on the base plate.

* * * * *